United States Patent
Kowkutla et al.

(10) Patent No.: US 12,493,340 B2
(45) Date of Patent: Dec. 9, 2025

(54) POWER-ON-RESET SIGNAL ISOLATION DURING LOWER POWER MODE

(71) Applicant: TEXAS INSTRUMENTS INCORPORATED, Dallas, TX (US)

(72) Inventors: Venkateswar Kowkutla, Allen, TX (US); Chunhua Hu, Plano, TX (US); Raghavendra Santhanagopal, McKinney, TX (US); Kazunobu Shin, Plano, TX (US); Charles Gerlach, Dallas, TX (US); Rejitha Nair, Southlake, TX (US); Ritesh Sojitra, Murphy, TX (US); Sai Rajaraman, Frisco, TX (US); Anthony Seely, Wylie, TX (US); Siva Srinivas Kothamasu, Frisco, TX (US); Varun Singh, McKinney, TX (US); John Apostol, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 197 days.

(21) Appl. No.: 18/060,114

(22) Filed: Nov. 30, 2022

(65) Prior Publication Data

US 2023/0205305 A1 Jun. 29, 2023

Related U.S. Application Data

(60) Provisional application No. 63/294,431, filed on Dec. 29, 2021.

(51) Int. Cl.
*G06F 1/3287* (2019.01)
*G06F 13/16* (2006.01)
*G06F 13/40* (2006.01)
*G06F 13/42* (2006.01)

(52) U.S. Cl.
CPC ........ *G06F 1/3287* (2013.01); *G06F 13/1668* (2013.01); *G06F 13/4068* (2013.01); *G06F 13/423* (2013.01)

(58) Field of Classification Search
None
See application file for complete search history.

(56) References Cited

U.S. PATENT DOCUMENTS

| | | | |
|---|---|---|---|
| 6,526,464 B1 * | 2/2003 | Jobs | G06F 13/4295 710/300 |
| 7,853,815 B2 * | 12/2010 | Tsai | G06F 1/266 713/323 |
| 2008/0005445 A1 * | 1/2008 | Diefenbaugh | G06F 13/385 710/313 |
| 2008/0246509 A1 * | 10/2008 | Xiao | G06F 1/24 327/143 |
| 2012/0303986 A1 * | 11/2012 | Flynn | G01R 31/318541 713/320 |
| 2013/0238916 A1 * | 9/2013 | Dohm | G06F 1/32 713/320 |
| 2017/0199835 A1 * | 7/2017 | Kim | G06T 1/20 |
| 2020/0192447 A1 * | 6/2020 | Paterson | H03K 19/0016 |

* cited by examiner

Primary Examiner — Paul Yen
(74) Attorney, Agent, or Firm — Xianghui Huang; Frank D. Cimino (57) ABSTRACT

A circuit device is provided and includes a first power domain comprising a universal serial bus (USB) subsystem and/or a memory controller subsystem. The first power domain is configured to isolate the USB subsystem and/or the memory controller subsystem from a power-on-reset signal asserted during a low power mode.

20 Claims, 10 Drawing Sheets

POWER-ON-RESET SIGNAL ISOLATION DURING LOWER POWER MODE

CROSS-REFERENCE TO RELATED APPLICATIONS

This application hereby claims the benefit of and priority to U.S. Provisional Patent Application Ser. No. 63/294,431, filed Dec. 29, 2021, entitled "Hardware Retention and Reset Isolation Mechanism for USB & DDR Subsystems to Minimize Power Consumption and Entry/Exit Latencies for Low Power Modes", which is hereby incorporated by reference in its entirety.

TECHNICAL FIELD

Aspects of the disclosure relate to semiconductor operation, and more particularly to isolation of a power-on-reset signal during a lower power mode.

BACKGROUND

In electronic design, a semiconductor intellectual property ("IP") core (often referred to as an "IP core", "IP module", or "IP block") references a reusable unit of logic, cell, or integrated circuit (commonly called a "chip") layout and design. In the context of this disclosure, IP will refer to the logic and/or metadata associated with design specifications of a portion of a chip or system on a chip ("SoC").

In an SoC, multiple power domains may be designed, each having respective IP blocks operating and receiving power from its power domain. To conserve power during inactive periods such as during periods of low utilization, some power domains will put their IP blocks into a low power (e.g., sleep mode) where their power is shut off to conserve energy. Other IP blocks will remain powered and can be used to exit the low power mode and initialize SoC wakeup procedures.

At device startup, such as when the entire SoC is powered on at the beginning of its operations, IP blocks are set up, and memory registers within the IP blocks are initialized and populated according to setup procedures. Similar initialization processes may be performed when exiting a low power mode (wakeup) because the low power mode, which is useful to conserve energy, can produce a loss or corruption of data stored in the IP block registers during the low power mode. However, this initialization may be slow, and when these techniques are used to initialize IP blocks during wakeup, the delay before the SoC is operational after wakeup may be similar to the delay during device startup.

SUMMARY

In accordance with one aspect of the present disclosure, a circuit device comprising a first power domain comprises a universal serial bus (USB) subsystem and a memory controller subsystem. The first power domain is configured to isolate the USB subsystem and the memory controller subsystem from a power-on-reset signal asserted during a low power mode.

In accordance with another aspect of the present disclosure, a method comprises asserting a power-on-reset signal from a main controller of a first power domain during a low power mode to a plurality of subsystems of the first power domain, wherein the plurality of subsystems comprises a memory controller subsystem. The method also comprises isolating the power-on-reset signal from the memory controller subsystem during the low power mode.

In accordance with another aspect of the present disclosure, a method comprises asserting a power-on-reset signal from a main controller of a first power domain during a low power mode to a plurality of subsystems of the first power domain, wherein the plurality of subsystems comprises a USB subsystem comprising a clock input and a data input and having a linked connection with an external USB device. The method also comprises isolating the power-on-reset signal from the USB subsystem during the low power mode.

DETAILED DESCRIPTION

Figure 1:
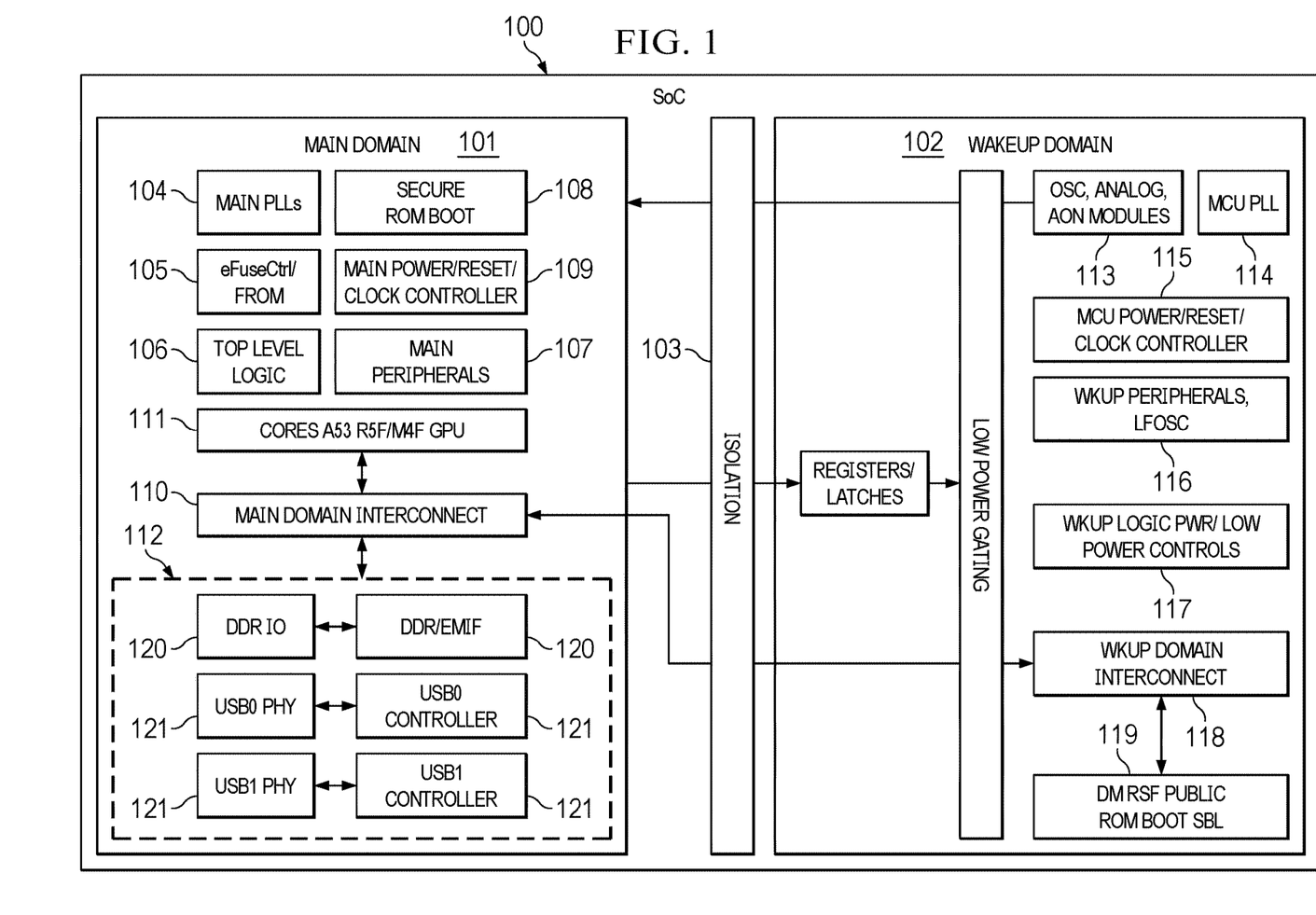
FIG. 1 is an example block diagram of a portion of an SoC according to one or more disclosed implementations.

FIG. 1 illustrates a block diagram of an SoC 100 according to one or more implementations. A typical SoC comprises multiple hardware components, including, but not limited to: a microcontroller, microprocessor, or digital signal processor (DSP) core (with multiprocessor SoCs (MPSoC) having more than one processor core); memory blocks including a selection of ROM, RAM, EEPROM, and flash memory; timing sources including oscillators and phase-locked loops (PLLs); peripherals including counter-timers, real-time timers, and power-on reset generators; external interfaces including industry standards such as USB, FireWire, Ethernet, USART, and SPI; analog interfaces including ADCs and DACs; and voltage regulators and power management circuits.

The above listing of hardware elements is not exhaustive. For simplicity, only a portion of the possible components that may be implemented in an entire SoC design are shown and discussed herein. The SoC 100 includes a pair of domain partitions including a main domain 101 and a wakeup domain 102. A hardware isolation 103 exists between the domains 101, 102 that isolates power and communication signals between the domains.

The main domain 101 has, for example, multiple power sub-domains existing on the SoC 100 having IP blocks or modules subjectable to power down during one or more low power modes. The power sub-domains may group IP modules by function type. For example, power sub-domains may be established for security devices, industrial communication devices, ethernet devices, graphics devices, display devices, etcetera. Examples of IP blocks or modules assigned to such power sub-domains are illustrated in FIG. 1 as modules 104-112. Other modules may also be included and are contemplated herein. One or more of modules 104-112 may belong to the same power sub-domain while others may share no common power sub-domain with their neighbors. Each module 104-111 may include one or more controllers having registers for storing values. For example, a software program being executed by the SoC 100 can cause the controller registers to store values relating to the program. In addition, the controllers may have other registers relating to configuration settings.

One feature of the SoC 100 includes power saving during a powered-down or sleep state where power usage may be reduced during periods of inactivity. Many of the IP blocks or modules belonging to the main domain 101 are capable of being controlled into low power modes to save energy during the sleep state. It may be beneficial to only include in the main domain 101 IP blocks that are capable of being controlled into a low power mode. However, one or more devices may be isolated from a powered-down mode.

Often, devices not desired to go into a power saving mode may belong to a domain that does not enter a power saving mode during the low power mode of the main domain 101, such as the wakeup domain 102. IP blocks or modules that are kept powered on during sleep events include modules 113-119 illustrated in FIG. 1. Some such modules may be responsible for waking up the IP blocks 104-112 of the main domain 101 after termination of the low power mode, maintaining operation of some clock signals, etcetera. The function of the modules in the wakeup domain 102 thus remain available for use during the low power mode.

Grouped together in a common sub-power domain within the main domain 101 are memory communication modules 120 and USB modules 121 of module 112. For optimal operation to achieve high throughput and low latencies, the modules 120, 121 are physically placed adjacent to processing sub-systems that utilize their functionality. Accordingly, these modules 120-121 are located in the main domain 101 that is typically commanded to power down during the low power mode. However, system-wide wakeup time after a low power mode can benefit from the modules 120, 121 not being powered down during sleep. For example, during startup of the SoC 100, modules 104-112 are initialized to predetermined states, and registers within the modules 104-112 are set up according to the boot sequence. Additionally, software to be executed by the modules 104-112 is used to set up the modules 104-112 and their registers to execute the software commands. During operation following the boot and setup sequences, registers and other memory devices within the modules 104-112 are changed and updated as the software program executes. During periods of inactivity where interruption of the software execution by entering the low power mode has, for example, minimal impact on the software, modules within the main domain 101 capable of going to sleep may be controlled to enter their power-down modes to conserve energy. However, it is desirable that the state of the registers and memory devices before the low power mode be restored as quickly as possible after the low power mode to resume the software execution where it was halted prior to the low power mode. Additionally, connections established with external devices prior to the low power mode can benefit from being maintained during the low power mode to reduce the time required to reestablish such connections should they be lost during the low power mode.

Figure 2A:
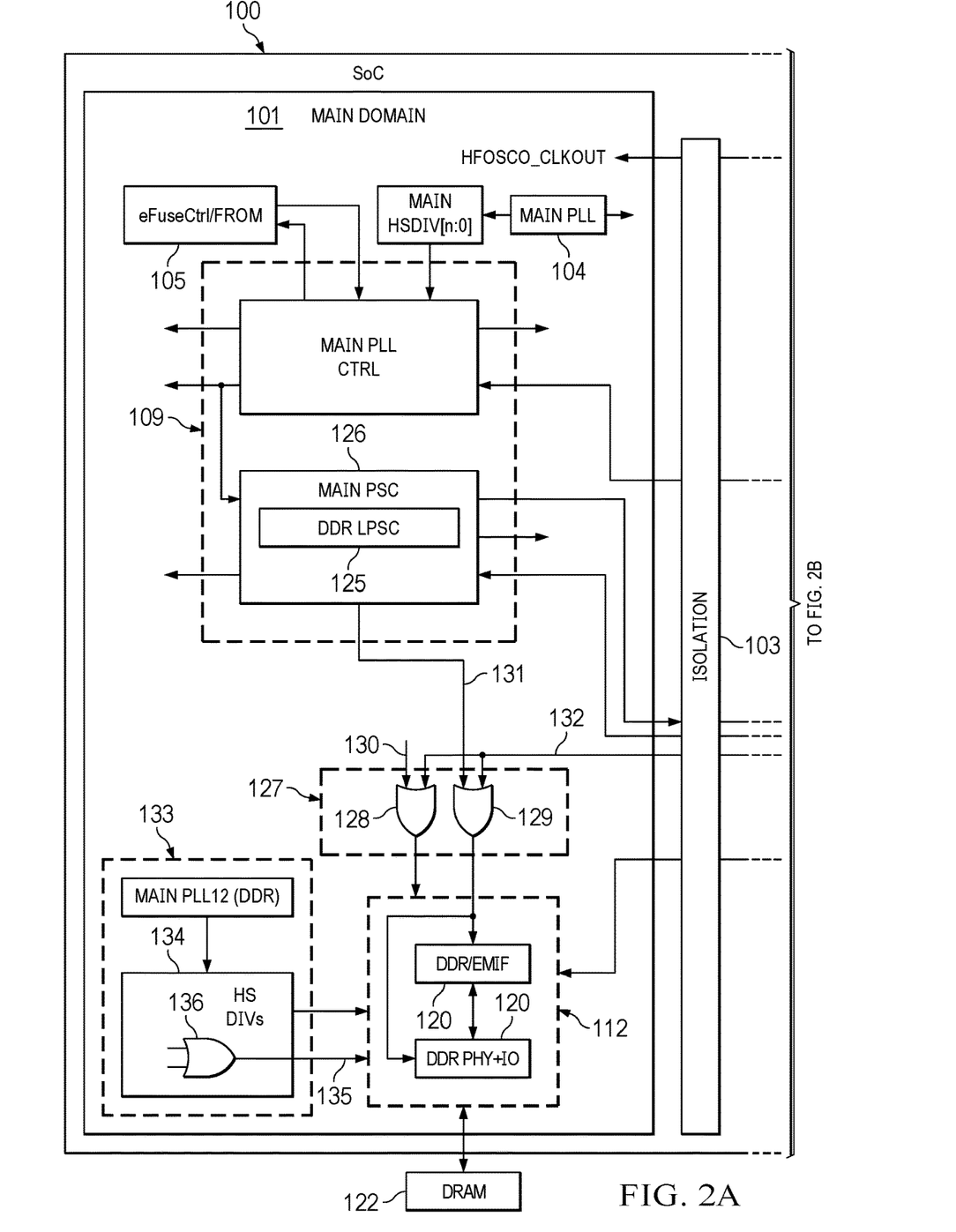
FIGS. 2A and 2B are example block diagrams of a portion of the SoC of FIG. 1 according to one or more disclosed implementations.
Figure 2B:
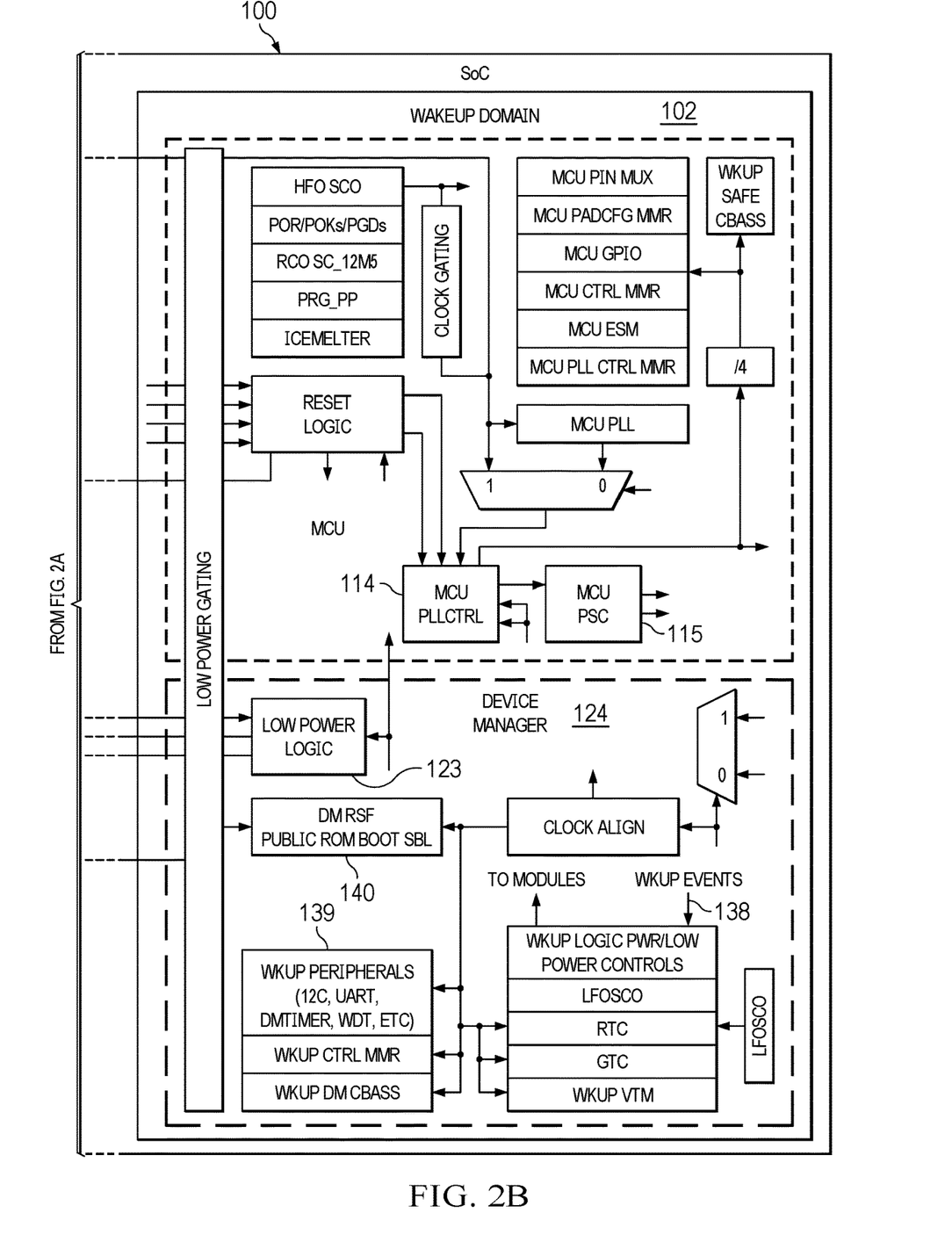

FIGS. 2A and 2B are example block diagrams of a portion of the SoC 100 for preserving DDR configuration and setup prior to entry into the low power mode and facilitation of a rapid restoration of a link with an external DDR device after the low power mode according to an example. The module 112 includes the memory communication modules 120 having hardware corresponding with communicating with an external memory storage 122 such as a DRAM storage. The external memory storage 122 is used during operations of the SoC 100 for memory storage and retrieval as called on by the software program executed in the SoC 100. For example, the SoC 100 may use the external memory storage 122 to store and retrieve data beyond the capacity of the internal memory storage within the SoC 100. If not addressed as described in this disclosure to maintain the configurations of the memory communication modules 120 during a low power mode, the established configurations can be lost, and reestablishing the configurations adds extra time to the restoration process during wakeup. By implementing embodiments of this disclosure, the time expended during the wakeup process can be reduced for restoring the functionality of the SoC 100 back to the state that existed prior to entering the low power mode.

Figure 3:
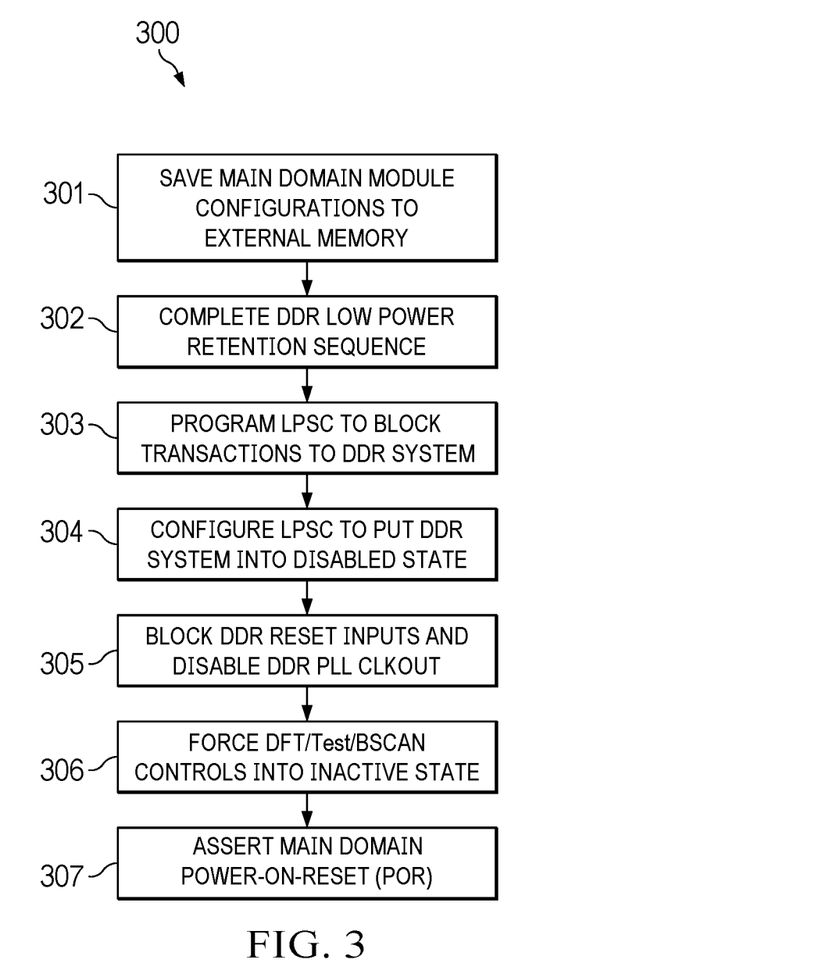
FIG. 3 is a flowchart illustrating a low power mode entry procedure for the SoC of FIGS. 2A and 2B according to one or more disclosed implementations.

FIG. 3 is a flowchart illustrating a low power mode entry procedure 300 according to one or more disclosed implementations. Referring to FIGS. 1-3, prior to putting the modules 104-111 of the main domain 101 into a low power mode, the modules' settings, including any internal register values and configurations of the module controllers storing the current state of the running software and other values used to define their operation during the execution of the software, are stored to the external memory storage 122. A low power logic module 123 in a device manager subdomain 124 of the wakeup domain 102 communicates with the main module 109 of the main domain 101 and may issue a command to the main module 109 to begin entry into the low power mode (step 301) by saving the module settings ahead of putting the main domain 101 into the low power mode. In one example, the external memory storage 122 may be a DRAM (dynamic random access memory) device and may be implemented using double data rate SDRAM (DDR SDRAM) technology. However, other memory technologies are also usable such as synchronous DRAM (SDRAM) technology, fast page mode DRAM (FPM DRAM) technology, extended data out DRAM (EDO DRAM) technology, and the like. Communications with the external memory storage 122 from within the SoC 100 may be accomplished via the memory communication modules 120, implemented as DDR communication modules 120 as illustrated in the figures of this disclosure. In response to receiving the command from the low power logic module 123 to begin preparing for the low power mode, the main module 109 may instruct the modules 104-111 to terminate any ongoing transactions gracefully and to communicate with the memory communication modules 120 for external memory storage of their register values and configurations. Alternatively, in another example, the main module 109 may be a relay for communications between the modules 104-111 and the memory communication modules 120.

The memory communication modules 120 support one or more low power modes. The one or more low power modes can be defined by industry standards for common functionality among various implementations of the DDR SDRAM technology. Following the data saving to the external memory storage 122 in step 301, a DDR low power mode retention sequence may be completed (step 302) to put the memory communication modules 120 into a low power consumption mode. The DDR low power mode retention sequence may include setting the clock signals of the memory communication modules 120 to LOW and setting reset signals to HIGH.

While a low power mode, such as that entered into by the memory communication modules 120 and the external memory storage 122, reduces energy usage, a further reduction of energy usage may be accomplished by putting other SoC components such as the modules 104-111 into a further low power mode that includes deactivating the devices by issuing reset commands to the modules. This low power mode may also include turning off power to one or more power sub-domains within the main domain 101 to achieve a power reduction to that of leakage power, for example.

To prepare for the low power mode, communications and other transactions to the memory communication modules 120 are blocked to isolate the DDR subsystem through the interconnect fabric. At step 303, a DDR LPSC (local power sleep controller) 125, which is a subsystem of the main power sleep control module 126 of the main module 109, is configured to disable transactions to the DDR subsystem and block its access by any of the other modules of the main domain 101. In one example, however, modules within the wakeup domain 102 may still have access to the memory communication modules 120.

At 304, the DDR LPSC 125 is configured to put the DDR system 120 into a disabled state. For example, data path clock signals transmitted to the DDR system 120 by the DDR LPSC 125 are stopped. In addition, a reset command received by the DDR system 120 during the low power mode is not desirable. Therefore, any reset communication line between the DDR system 120 and the DDR LPSC 125 is de-asserted.

As described below, power-on-reset is asserted throughout the main domain 101 during the low power mode. However, as stated above, it is not desirable to reset the DDR system 120 during the low power mode. If the DDR system 120 were to reset during the low power mode, it would need to be reconfigured as initially done during SoC startup, which can add undesirable time to the wakeup mode when coming out of the low power mode. Therefore, maintaining the setup of the DDR system 120 already performed is preferred. To block of reset signals sent to the DDR system 120 by the main power sleep control module 126 or any other module asserting a low power mode reset signal, a logic circuit 127 is controlled (305) to block DDR reset inputs and DDR clock signals from reaching the memory communication modules 120. As illustrated, the logic circuit 127 can include logic gates such as OR gates 128, 129 that output logic HIGH signals when either input receives a logic HIGH signal. The power-on-reset signal issued in the main domain 101 to command the various modules 104-111 into their reset modes is a logic LOW signal in one example. That is, when the reset inputs of the various modules 104-111 receive the logic LOW signal, the modules 104-111 enter into a reset state. By forcing a mask input to the OR gate 128 into a logic HIGH signal, a power-on-reset signal 130 set to a logic LOW value received by the other input is not seen at the output of the OR gate 128. Similarly, a logic HIGH signal received on a mask input to the OR gate 129 masks a reset signal 131 received by the other input to the OR gate 129. In one example, the low power logic module 123 from the wakeup domain 102 transmits a logic HIGH reset mask signal 132 to the mask inputs of the OR gates 128, 129. In addition to blocking the DDR reset inputs, step 305 also disables DDR clock signals from a DDR control circuit 133. For example, one or more divider modules 134 of the DDR control circuit 133 sends clock control signals (e.g., I/O clock signals) 135 to the module 112. Disabling the DDR clock signals may include masking the clock control signals 135 via control logic 136 or controlling the divider module 134 to halt generation of the clock signals.

After step 305 has been performed, the DDR system 120 is gated off from clock, reset, and other communication signals from within the main domain 101. In this manner, the states of the memory communication modules 120 are prevented from being changed until masking signals are removed and control signals are made active once again. The DDR system 120 is thus protected against changes to its configuration during the low power mode. In one example, additional signals and controls are still active in the main domain 101 and are forced into an inactive state (step 306) to have reduced power consumption during the low power mode. Such controls include DFT (design-for-test) controls, other test controls, and boundary scan controls. Other signals and controls may also be inactivated.

At step 307 of the deep-sleep entry procedure 300, a power-on-reset signal is asserted throughout the main domain 101 to put the modules receiving the power-on-reset signal (e.g., modules 104-111) into the low power mode. Since the power-on-reset signal is gated from the DDR system 120, the DDR system 120 does not enter a low power mode. In this manner, the DDR system 120 can quickly respond to wakeup signals for rapid reestablishment of the active state of the main domain 101 without having to go through a boot sequence again. Accordingly, while the remainder of the modules of the main domain 101 are in a low power mode and have their reset inputs activated, the DDR system 120 has maintained its connection settings with the external memory storage 122 in the low power state and has maintained all of its configuration settings.

Figure 4:
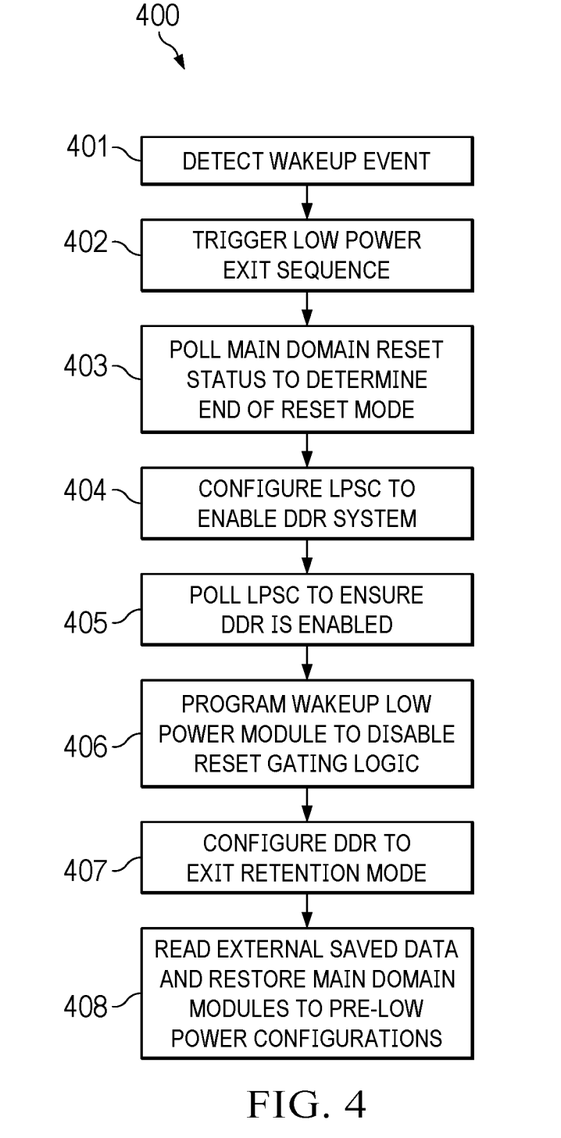
FIG. 4 is a flowchart illustrating a wakeup procedure for the SoC of FIGS. 2A and 2B according to one or more disclosed implementations.

FIG. 4 is a flowchart illustrating a wakeup procedure 400 according to one or more disclosed implementations. Referring to FIGS. 1, 2, and 4, the SoC 100 detects a wakeup event (step 401) that signals to the wakeup domain 102 that the low power mode should end so that the SoC 100 can be brought back into operation as it was prior to preparing for and entering the low power mode. The wakeup event detection can be initiated by a wakeup logic module 137 detecting a wakeup event 138 such as a signal or the start of a signal on external input/output (I/O) ports to the SoC 100. In addition or alternatively thereto, a sleep timer could be set in a wakeup domain peripheral module 139 to generate a wakeup interrupt after a preset time. Detection of the wakeup interrupt can be used to trigger wakeup of the main domain 101 from the low power mode via a low power manager 140. In response to detecting the wakeup event, the low power manager 140 triggers (step 402) a low power exit sequence that disengages the logic used to prepare the main domain 101 for the low power mode. A reset mode is enabled to bring the main domain 101 out of the low power mode. For example, the power-on-reset signal to the modules 104-111 is removed or de-asserted, and device clocks in the main domain 101 are reenabled.

The reset status of the main domain 101 is polled (step 403) by the low power manager 140 to determine the end of the reset mode. For example, while the main domain 101 is booting up during the reset mode, a reset status flag may be set to a predetermined value (e.g., a logic LOW value) to indicate that the main domain 101 is in the reset mode. During the reset mode, for example, device security control settings may be set to initial values read from ROM accessible by the main domain 101. In response to detecting a logic HIGH value in the reset status flag, the main domain 101 may be determined to be finished with the reset mode, and the low power manager 140 configures (step 404) the DDR LPSC 125 to enable the DDR system 120. Enabling the DDR system 120 includes undoing the controls set during the low power entry procedure 300 to disable the DDR system 120. For example, data path clock signals transmitted to the DDR system 120 by the DDR LPSC 125 are resumed.

At step 405, the low power manager 140 polls the DDR LPSC 125 to ensure the DDR system 120 is enabled. An enabled flag may be set in response to enabling all clocks into the DDR system 120 including the clock control signals 135 from the divider module 134. At step 406, the low power logic module 123 de-asserts the reset mask signal 132 to reset the gating logic 127 to remove masking of the input for the power-on-reset signal 130 and the input for the reset signal 131. The low power manager 140 configures the DDR system 120 to exit its data retention mode at step 407, which enables the DDR system 120 to restore (step 408) the configurations and memory values of the modules 104-111 stored in the external memory storage 122 to their pre-low power mode states. The restoration of the main domain 101 in this manner allows the main domain 101 to be quickly restored back to the same state it was at prior to entry into the low power mode.

Figure 5A:
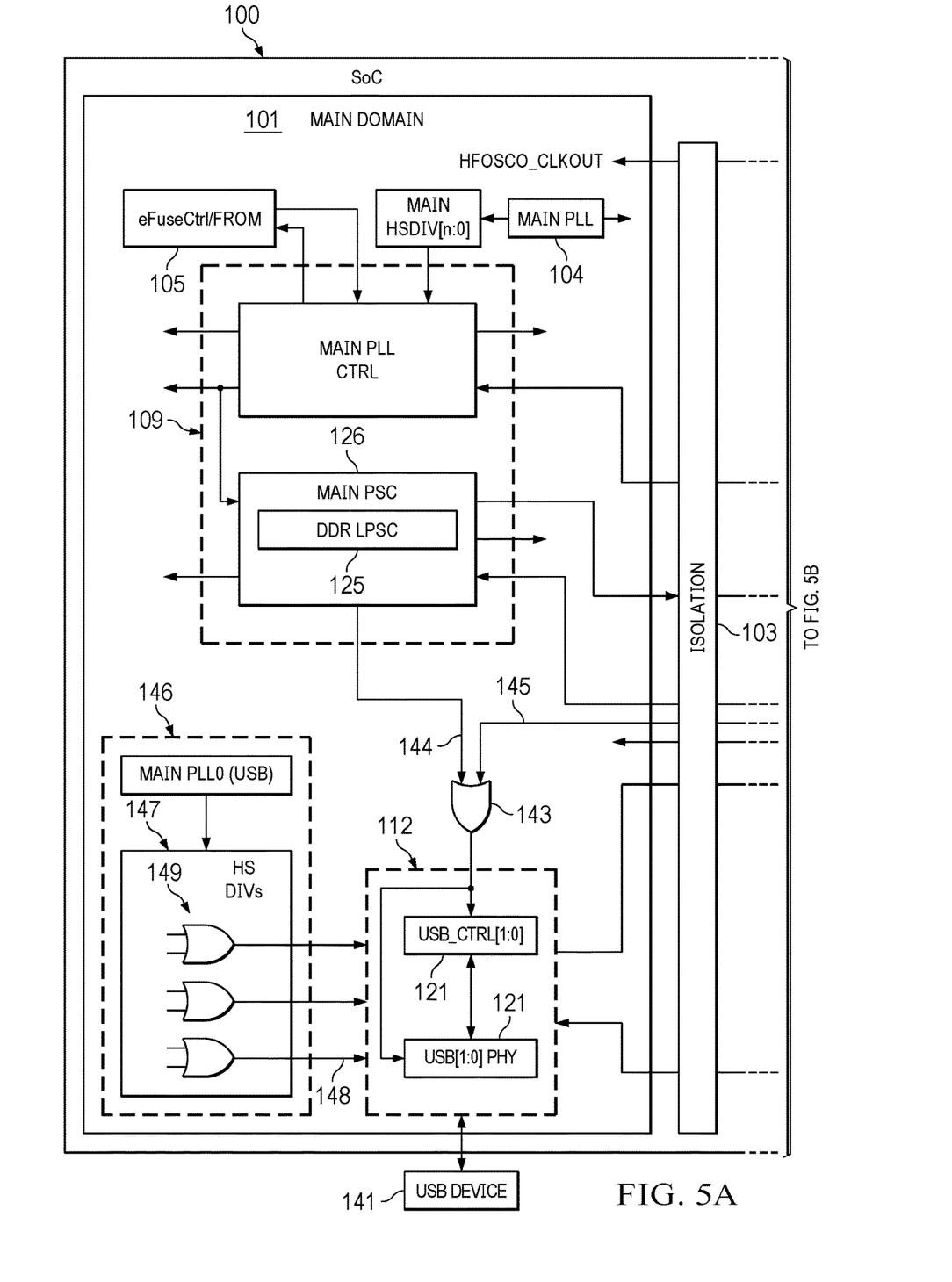
FIGS. 5A and 5B are example block diagrams of a portion of the SoC of FIG. 1 according to one or more disclosed implementations.
Figure 5B:
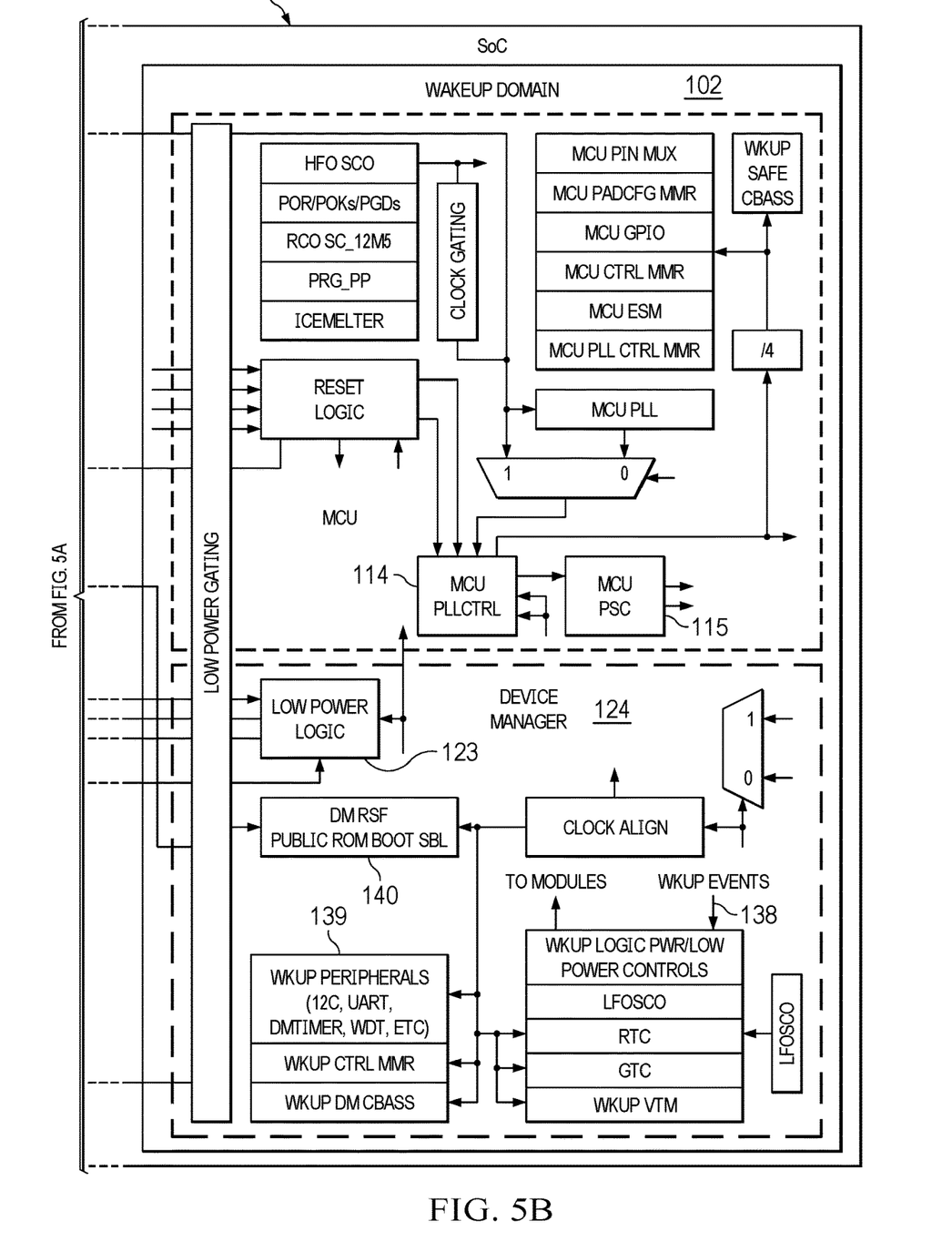

FIGS. 5A and 5B are example block diagrams of a portion of the SoC 100 for storing register and memory data prior to entry into the low power mode and facilitation of a rapid restoration of the data after the low power mode according to an example. The module 112 includes the USB modules 121 having hardware corresponding with communicating with an external USB device 141. If not addressed as described in this disclosure to maintain the configurations of the USB modules 121 during the low power mode, the established configurations can be lost, and reestablishing the configurations adds extra time to the restoration process during wakeup. By implementing embodiments of this disclosure, the time expended during the wakeup process can be reduced for restoring the communication link between the USB modules 121 and the external USB device 141 back to the state that existed prior to entering the low power mode.

Figure 6:
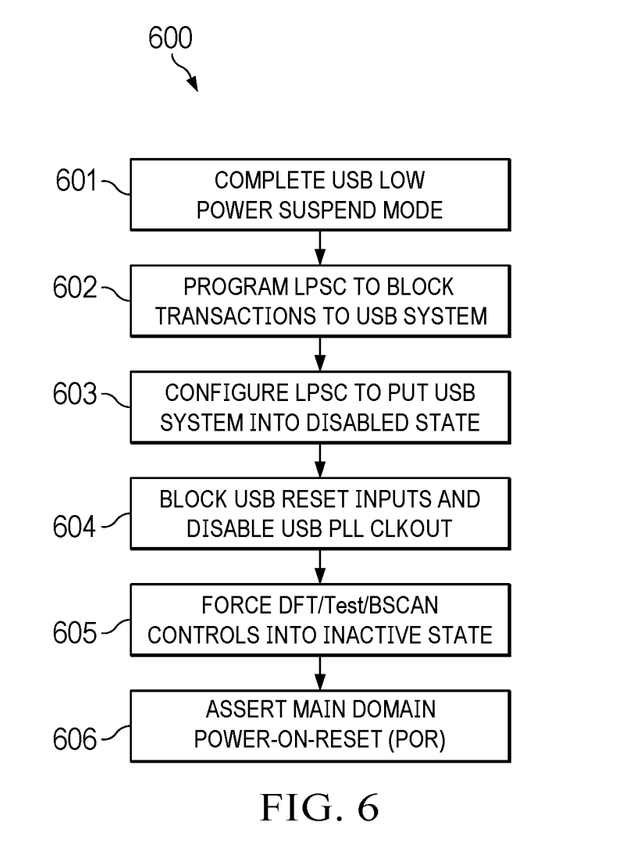
FIG. 6 is a flowchart illustrating a low power mode entry procedure for the SoC of FIGS. 5A and 5B according to one or more disclosed implementations.

FIG. 6 is a flowchart illustrating a low power entry procedure 600 according to one or more disclosed implementations. Referring to FIGS. 1, 5, and 6, the USB modules 121 support one or more low power suspend modes. The one or more low power modes can be defined by industry standards for common functionality among various implementations of the USB technology. A USB low power mode suspend sequence may be completed (step 601) to put the USB modules 121 into a low power suspend mode.

While a low power suspend mode such as that entered into by the USB modules 121 reduces energy usage, a further reduction of energy usage may be accomplished by putting other SoC components such as the modules 104-111 into a further low power mode that includes deactivating the devices by issuing reset commands to the modules. This low power mode may also include turning off power to one or more power domains within the main domain 101 to achieve a power reduction to that of leakage power.

To prepare for the low power mode, communications and other transactions to the USB modules 121 are blocked to isolate the USB subsystem through the interconnect fabric. At step 602, a USB LPSC 142, which is a subsystem of the main power sleep control module 126 of the main module 109, is configured to disable transactions to the USB subsystem and block its access by any of the other modules of the main domain 101. In one example, however, modules within the wakeup domain 102 may still have access to the USB modules 121.

At 603, the USB LPSC 142 is configured to put the USB modules 121 into a disabled state. For example, data path clock signals transmitted to the USB modules 121 by the USB LPSC 142 are stopped. In addition, a reset command received by the USB modules 121 during the low power mode is not desirable. Therefore, any reset communication line between the USB modules 121 and the USB LPSC 142 is de-asserted.

As described herein, power-on-reset is asserted throughout the main domain 101 during the low power mode. However, as stated above, it is not desirable to reset the USB modules 121 during the low power mode. If the USB modules 121 were to reset during the low power mode, it would need to be reconfigured as initially done during SoC startup, which can add undesirable time to the wakeup mode when coming out of the low power mode. Therefore, maintaining the setup of the USB modules 121 and their link configurations with any external USB devices that has already been performed is preferred. To block of reset signals sent to the USB modules 121 by the main power sleep control module 126 or any other module asserting a low power mode reset signal, a logic circuit 143 is controlled (604) to block USB reset inputs and USB clock signals from reaching the USB modules 121. As illustrated, the logic circuit 127 can include a logic gate such as an OR gate that outputs logic HIGH signals when either input receives a logic HIGH signal. The power-on-reset signal issued in the main domain 101 to command the various modules 104-111 into their reset modes is a logic LOW signal in the examples herein. That is, when the reset inputs of the various modules 104-111 receive the logic LOW signal, the modules 104-111 enter into a reset state. By forcing a mask input to the OR gate 127 into a logic HIGH signal, a power-on-reset signal 144 set to a logic LOW value received by the other input is not seen at the output of the OR gate 127. In one example, the low power logic module 123 from the wakeup domain 102 transmits a logic HIGH reset mask signal 145 to the mask inputs of the OR gate 127. In addition to blocking the USB reset inputs, step 604 also disables USB clock signals from a USB control circuit 146. For example, one or more divider modules 147 of the USB control circuit 146 sends clock control signals (e.g., I/O clock signals) 148 to the module 112. Disabling the USB clock signals 148 may include masking the clock control signals 148 via control logic 149 or controlling the divider module 134 to halt generation of the clock signals.

After step 604 has been performed, the USB modules 121 are gated off from clock, reset, and other communication signals from within the main domain 101. In this manner, the states of the USB modules 121 are prevented from being changed until masking signals are removed and control signals are made active once again. The USB modules 121 are thus protected against changes to their configurations during the low power mode. In one example, additional signals and controls are still active in the main domain 101 and are forced into an inactive state (step 605) to have reduced power consumption during the low power mode. Such controls include DFT (design-for-test) controls, other test controls, and boundary scan controls. Other signals and controls may also be inactivated.

At step 606 of the deep-sleep entry procedure 600, a power-on-reset signal is asserted throughout the main domain 101 to put the modules receiving the power-on-reset signal (e.g., modules 104-111) into the low power mode. Since the power-on-reset signal is gated from the USB modules 121, the USB system 121 does not enter a low power mode. In this manner, the USB system 121 can quickly respond to wake up signals for rapid reestablishment of the active state of the main domain 101 without having to go through a boot sequence again. Accordingly, while the remainder of the main domain 101 is in a low power mode and have their reset inputs activated, the USB system 121 has maintained its link configuration with the external USB device 141 in the low power state and has maintained all of its configuration settings.

The low power mode may be maintained until a wakeup event signals to the wakeup domain 102 that the low power mode should end so that the SoC 100 can be brought back into operation as it was prior to preparing for and entering the low power mode. The wakeup event detection can be initiated by the wakeup logic module 137 detecting the wakeup event 138 such as a signal or the start of a signal on external input/output (I/O) ports to the SoC 100. In addition or alternatively thereto, a sleep timer could be set in the wakeup domain peripheral module 139 to generate a wakeup interrupt after a preset time. The wakeup signal may also be generated by the external USB device 141. However, since the boundary of the USB modules 121 is gated off such that communications and clock signals into the module 112 are blocked, the USB modules 121 do not receive a communication or signal from the external USB device 141 that it wants to communicate with the SoC 100 and to, therefore, generate a wakeup event.

Figure 7:
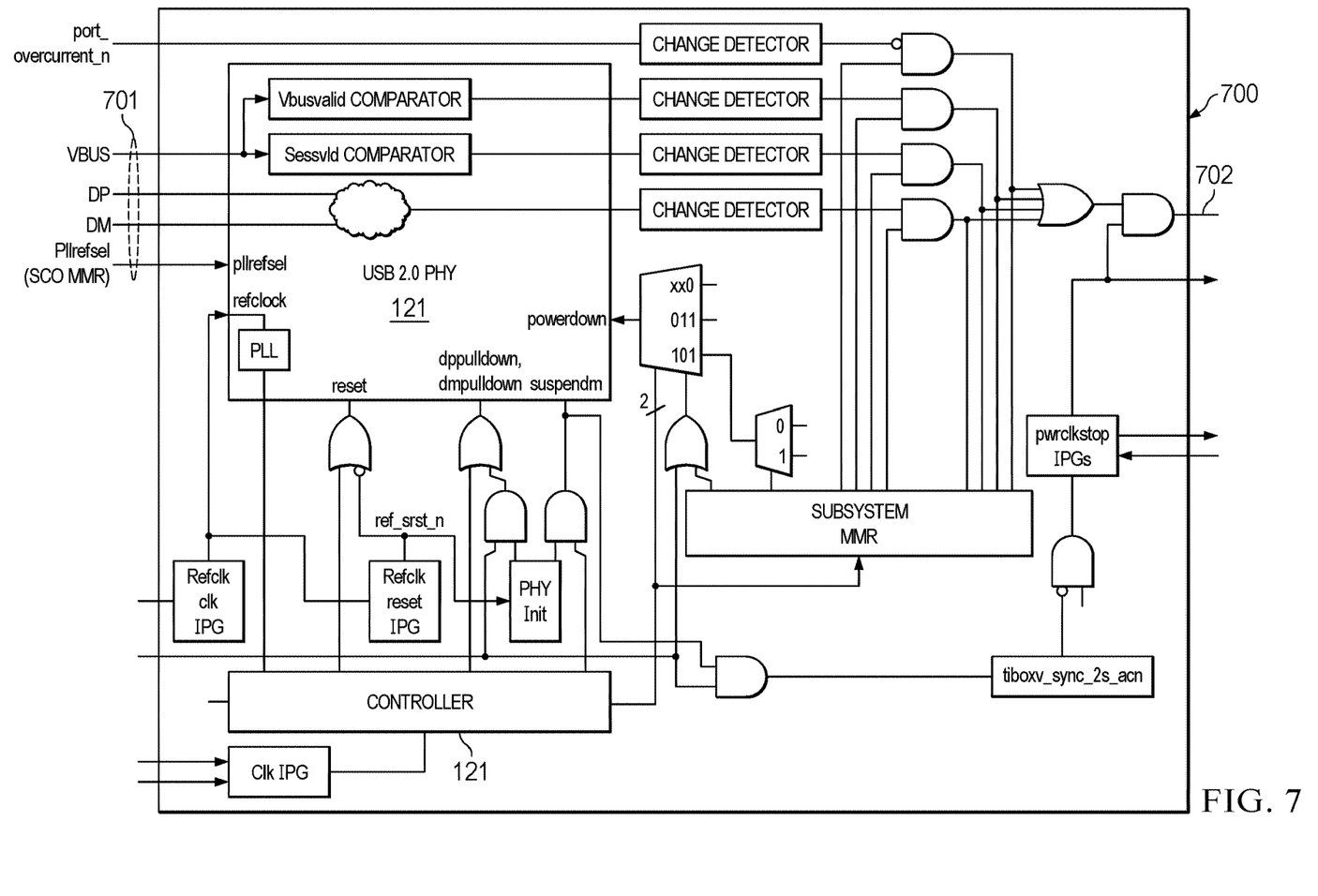
FIG. 7 is an example circuit diagram of a USB peripheral activity monitoring circuit according to one or more disclosed implementations.

Accordingly, FIG. 7 illustrates additional hardware logic implementing a USB peripheral activity monitoring circuit 700 according to one or more disclosed implementations. The USB monitoring circuit 700 includes an in-band wakeup circuit coupled with the USB physical layer and controller modules 121 and is configured to detect activity on a data input 701 from the external USB device 141. In response to detecting the activity, the USB monitoring circuit 700 generates a wakeup event on a wakeup output 702 that is detectable to bring the SoC 100 out of the low power mode.

Figure 8:
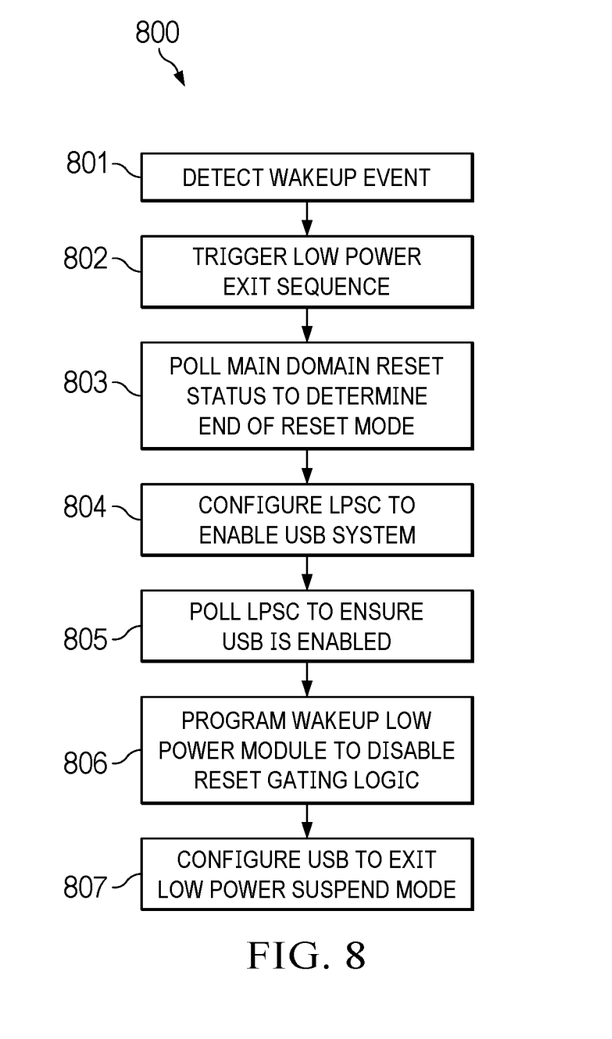
FIG. 8 is a flowchart illustrating a wakeup procedure for the SoC of FIGS. 5A and 5B according to one or more disclosed implementations.

FIG. 8 is a flowchart illustrating a wakeup procedure 800 according to one or more disclosed implementations. Referring to FIGS. 1, 5, and 8, the SoC 100 detects a wakeup event (step 801) via the low power manager 140 that may be generated as described above and can be used to trigger wakeup of the main domain 101 from the low power mode. In response to detecting the wakeup event, the low power manager 140 triggers (step 802) a low power exit sequence that disengages the logic used to prepare the main domain 101 for the low power mode. A reset mode is enabled to bring the main domain 101 out of the low power mode. For example, the power-on-reset signal to the modules 104-111 is removed or de-asserted, and device clocks in the main domain 101 are reenabled.

The reset status of the main domain 101 is polled (step 803) by the low power manager 140 to determine the end of the reset mode. For example, while the main domain 101 is booting up during the reset mode, a reset status flag may be set to a predetermined value (e.g., a logic LOW value) to indicate that the main domain 101 is in the reset mode. During the reset mode, for example, device security control settings may be set to initial values read from ROM accessible by the main domain 101. In response to detecting a logic HIGH value in the reset status flag, the main domain 101 may be determined to be finished with the reset mode, and the low power manager 140 configures (step 804) the USB LPSC 142 to enable the USB system 121. Enabling the USB system 121 includes undoing the controls set during the deep-sleep entry procedure 600 to disable the USB system 121. For example, data path clock signals transmitted to the USB system 121 by the USB LPSC 142 are resumed.

At step 805, the low power manager 140 polls the USB LPSC 142 to ensure the USB system 121 is enabled. An enabled flag may be set in response to enabling all clocks into the USB system 121 including the clock control signals 148 from the divider module 147. At step 806, the low power logic module 123 de-asserts the reset mask signal 145 to reset the gating logic 143 to remove masking of the input for the power-on-reset signal 144. The low power manager 140 configures the USB system 121 to exit its low power suspend mode at step 807.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:
1. A circuit device comprising:
  a first power domain comprising:
    a universal serial bus (USB) subsystem configured to store a first value and enter a reset state in response to receiving a power-on-reset signal;
    a memory controller subsystem configured to store a second value and enter the reset state in response to receiving the power-on-reset signal;
    an intellectual property (IP) module configured to store a third value and enter the reset state in response to receiving the power-on-reset signal;
    a main controller configured to:
      cause the IP module to store the third value in memory external to the first power domain in preparation for a low power mode prior to activating the power-on-reset signal throughout the first power domain;
activate the power-on-reset signal throughout the first power domain during the low power mode; and
circuitry configured to isolate the USB subsystem and the memory controller subsystem, not the IP module, from the power-on-reset signal such that the third value, not the first and second values, is reset by the power-on-reset signal.

2. The circuit device of claim 1, wherein the circuitry comprises a logic circuit coupled with the USB subsystem and the memory controller subsystem;
wherein the logic circuit is configured to:
receive the power-on-reset signal;
receive a reset mask signal; and
gate transmission of the power-on-reset signal to the USB subsystem and to the memory controller subsystem based on the reset mask signal.

3. The circuit device of claim 2 further comprising a second power domain coupled with the first power domain;
wherein the second power domain comprises a low power controller configured to transmit the reset mask signal to the logic circuit.

4. The circuit device of claim 3, wherein the circuitry is configured to isolate the USB subsystem and the memory controller subsystem from the power-on-reset signal in response to the reset mask signal indicating a gating command to the logic circuit.

5. The circuit device of claim 3,
wherein the second power domain is configured to transmit the reset mask signal indicating the gating command to the logic circuit prior to the activation of the power-on-reset signal by the main controller.

6. The circuit device of claim 1 further comprising:
a memory storage; and
a plurality of controllers including the IP module, each controller comprising one or more registers having data therein;
wherein the memory controller subsystem is configured to store the data of the one or more registers in the memory storage prior to the activation of the power-on-reset signal; and
wherein the memory storage is configured to store the third value.

7. The circuit device of claim 5, wherein the main controller is configured to de-activate the power-on-reset signal; and
wherein the second power domain is configured to cease transmission of the reset mask signal after the de-activation of the power-on-reset signal by the main controller.

8. The circuit device of claim 5, wherein the USB subsystem comprises a data input coupled with an external USB device; and
further comprising an in-band wakeup circuit coupled with the USB subsystem and configured to:
detect activity on the data input from the external USB device; and
communicate with the second power domain in response to the detected activity;
wherein, in response to receiving the communication from the in-band wakeup circuit, the second power domain is configured to transmit a wakeup signal to the first power domain to exit the low power mode.

9. A method comprising:
storing, in preparation for a low power mode, a first register value of an intellectual property (IP) module in memory external to the first power domain;
activating a power-on-reset signal from a main controller of the first power domain during the low power mode to a plurality of subsystems of the first power domain, wherein the plurality of subsystems comprises the IP module and a memory controller subsystem coupled with the memory external to the first power domain;
isolating the power-on-reset signal from the memory controller subsystem during the low power mode while providing the power-on-reset signal to the IP module during the lower power mode to reset the first register value in the IP module.

10. The method of claim 9, wherein isolating the power-on-reset signal comprises gating the power-on-reset signal off from the memory controller subsystem via a logic circuit.

11. The method of claim 10 further comprising transmitting a gating signal to the logic circuit from a low power controller of a second power domain prior to activating the power-on-reset signal;
wherein the gating signal is configured to mask the power-on-reset signal from the memory controller subsystem.

12. The method of claim 11 further comprising removing the gating signal from the logic circuit after the low power mode, the removal of the gating signal allowing the logic circuit to transmit the power-on-reset signal to the memory controller subsystem during a non-low power mode.

13. The method of claim 10, wherein the main controller comprises a local power sleep controller;
wherein the first power domain further comprises a data interface coupled with the memory controller subsystem and configured to transmit data communications to the memory controller subsystem; and
wherein the method further comprises controlling the local power sleep controller to disable the data interface to block data signals into the memory controller subsystem during the low power mode.

14. The method of claim 9 further comprising isolating the memory controller subsystem from clock signals during the low power mode, the clock signals configured to control operation of the memory controller subsystem.

15. The method of claim 9, wherein the plurality of subsystems further comprises a plurality of modules, each module having one or more registers storing operational data; and
wherein the method further comprises:
storing, via the memory controller subsystem, the operational data stored in the one or more registers to memory external to the first power domain prior to activating the power-on-reset signal;
de-activating the power-on-reset signal; and
restoring, via the memory controller subsystem, the operational data stored in the memory external to the first power domain to the respective registers after de-activating the power-on-reset signal.

16. A method comprising:
storing, in preparation for a low power mode, a first register value of an intellectual property (IP) module in memory external to the first power domain;
activating a power-on-reset signal from a main controller of the first power domain during the low power mode to a plurality of subsystems of the first power domain, wherein the plurality of subsystems comprises the IP module and a USB subsystem comprising a clock input and a data input and having a linked connection with an external USB device;
isolating the power-on-reset signal from the USB subsystem during the low power mode while providing the power-on-reset signal to the IP module during the lower power mode to reset the first register value in the IP module.

17. The method of claim 16 further comprising disabling clock signals on the clock input during the low power mode.

18. The method of claim 17 further comprising detecting a data transaction on the data input during the disabling of the clock signals, the data transaction initiated by the external USB device.

19. The method of claim 18 further comprising issuing a wakeup command to the first power domain in response to detecting the data transaction;
wherein the wakeup command is configured to cause the first power domain to:
de-activate the power-on-reset signal;
enable the clock signals after the de-activation; and
operate in a restored active mode after exiting the low power mode; and
wherein the method further comprises controlling the USB subsystem to transact with the external USB device during the restored active mode.

20. The method of claim 19 further comprising establishing the linked connection in the USB subsystem between the USB subsystem and the external USB device prior to activating the power-on-reset signal; and
maintaining the linked connection in the USB subsystem throughout the low power mode and into the restored active mode after exiting the low power mode.

* * * * *